United States Patent
Yamamoto et al.

(10) Patent No.: US 10,384,975 B2
(45) Date of Patent: Aug. 20, 2019

(54) GLASS FOR PHARMACEUTICAL CONTAINERS

(71) Applicant: NIPPON ELECTRIC GLASS CO., LTD., Otsu-shi, Shiga (JP)

(72) Inventors: Kazuyuki Yamamoto, Shiga (JP); Ken Choju, Shiga (JP)

(73) Assignee: NIPPON ELECTRIC GLASS CO., LTD., Otsu-shi, Shiga (JP)

( * ) Notice: Subject to any disclaimer, the term of this patent is extended or adjusted under 35 U.S.C. 154(b) by 0 days.

(21) Appl. No.: 14/895,089

(22) PCT Filed: Jun. 4, 2014

(86) PCT No.: PCT/JP2014/065394
§ 371 (c)(1),
(2) Date: Dec. 1, 2015

(87) PCT Pub. No.: WO2014/196655
PCT Pub. Date: Dec. 11, 2014

(65) Prior Publication Data
US 2016/0107924 A1    Apr. 21, 2016

(30) Foreign Application Priority Data
Jun. 6, 2013 (JP) ................................. 2013-119894

(51) Int. Cl.
C03C 3/087 (2006.01)
C03C 3/091 (2006.01)
C03C 3/093 (2006.01)
C03C 4/20 (2006.01)
A61J 1/05 (2006.01)

(52) U.S. Cl.
CPC ................ C03C 4/20 (2013.01); C03C 3/087 (2013.01); C03C 3/091 (2013.01); C03C 3/093 (2013.01); A61J 1/05 (2013.01)

(58) Field of Classification Search
CPC ......... C03C 3/083; C03C 3/085; C03C 3/087; C03C 3/091; C03C 3/093; C03C 4/20
See application file for complete search history.

(56) References Cited

U.S. PATENT DOCUMENTS

| 5,736,476 A | 4/1998 | Watzke et al. |
| 2003/0087745 A1 | 5/2003 | Peuchert et al. |
| 2010/0087307 A1 | 4/2010 | Murata et al. |
| 2011/0098172 A1 | 4/2011 | Brix |
| 2012/0183812 A1 | 7/2012 | Kajita |
| 2013/0101596 A1 | 4/2013 | DeMartino et al. |
| 2013/0101764 A1 | 4/2013 | Schaut et al. |
| 2013/0101853 A1 | 4/2013 | Drake et al. |
| 2014/0356576 A1* | 12/2014 | Dejneka ................ C03C 3/093 428/141 |

FOREIGN PATENT DOCUMENTS

| CN | 101033115 A | 9/2007 | |
| JP | H09-118541 A | 5/1997 | |
| JP | 2004-504258 T | 7/2004 | |
| JP | 2006-290704 A | 10/2006 | |
| JP | 2006290704 A * | 10/2006 | ............ C03C 3/083 |
| JP | 2009-013052 A | 1/2009 | |
| JP | 2011-093792 A | 5/2011 | |
| JP | 2014144905 A * | 8/2014 | ............ C03C 3/087 |
| WO | WO-99/05070 A1 | 2/1999 | |
| WO | WO-2011-037001 A1 | 3/2011 | |
| WO | WO-2013-063002 A2 | 5/2013 | |
| WO | WO-2013/063275 A1 | 5/2013 | |
| WO | WO-2014025009 A1 * | 2/2014 | ............ C03C 3/087 |

OTHER PUBLICATIONS

Emanuel Guadagnino et al., "Delamination Propensity of Pharmaceutical Glass Containers by Accelerated Testing with Different Extraction Media," PDA Journal of Pharmaceutical Science and Technology, 2012, pp. 116-125, vol. 6, No. 2.
Notification of Reasons for Refusal dated May 9, 2018 in Japanese Patent Application No. 2014-109766 (2 pages) with an English translation (2 pages).
Extended European Search Report dated Oct. 19, 2018 in European Patent Application No. 18178731.8.
Office Action dated Jan. 4, 2019 in U.S. Appl. No. 15/974,257.
Third Office Action dated Jan. 11, 2019 in Chinese Patent Application No. 201480031674.6 (5 pages) with an English translation (9 pages).
Decision on Rejection dated Apr. 9, 2019 in Chinese Patent Application No. 201480031674.6 (4 pages) with an English translation (7 pages).

* cited by examiner

*Primary Examiner* — Elizabeth A. Bolden
(74) *Attorney, Agent, or Firm* — Drinker Biddle & Reath LLP

(57) ABSTRACT

A glass for pharmaceutical containers, which is resistant to delamination and has excellent processibility, is provided. The glass for pharmaceutical containers comprises, in mol % on an oxide basis, 69 to 81% of $SiO_2$, 4 to 12% of $Al_2O_3$, 0 to 5% of $B_2O_3$, to 20% of $Li_2O+Na_2O+K_2O$, 0.1 to 12% of $Li_2O$, and 0 to 10% of $MgO+CaO+SrO+BaO$. The glass has a hydrolytic resistance of Class 1 in a test in accordance with the European pharmacopoeia.

18 Claims, No Drawings

GLASS FOR PHARMACEUTICAL CONTAINERS

TECHNICAL FIELD

The present invention relates to a glass for pharmaceutical containers, which has excellent chemical durability and also has excellent processibility.

BACKGROUND ART

As containers for packing and storing pharmaceuticals, glasses made of various materials have been used. Pharmaceuticals are roughly divided into oral agents and parenteral agents. Among them, in the case of parenteral agents, a liquid medicine packed/stored in a glass container is directly administered into the patient's blood. Therefore, there are extremely rigorous quality requirements for such glass containers. In particular, extractables from the glass into the liquid medicine may change the properties of the liquid medicine, seriously affecting the life and health of the patient. Therefore, the pharmacopoeia of each country prescribes the amount of extractables from the glass. In addition, for processing into various forms such as ampoules, vials, prefilled syringes, and cartridges, excellent viscosity characteristics are necessary.

As a glass material that meets these requirements, borosilicate glass has generally been used. Borosilicate glass for pharmaceutical containers normally contains, as constituents, $SiO_2$, $Al_2O_3$, $B_2O_3$, $Na_2O$, $K_2O$, CaO, and BaO together with a small amount of fining agent.

CITATION LIST

Patent Literature

[PTL 1] WO 2013/063275

Non-Patent Literature

[NPTL 1] PDA J Pharm Sci and Tech 2012, 66 116

SUMMARY OF INVENTION

Technical Problem

In recent years, with the rapid advance of pharmaceutical sciences, a wide variety of medicines have been produced, and medicines to be packed in pharmaceutical containers have been changing, which is accompanied by an increase in the number of powerful medicines that corrode glass containers. When such a medicine is packed/stored in a glass container, the inner surface of the container peels off and floats as flakes in the liquid medicine. This phenomenon, called delamination, has been a serious problem.

Various studies have been conducted to find out the causes of delamination. As in NPTL 1, the boron component contained in borosilicate glass used as a glass for pharmaceutical containers evaporates during thermal processing, resulting in the formation of a silica rich layer, or the evaporated component recondenses on the container inner surface, which occasionally causes phase separation on the inner surface of the glass container; this is believed to be one of the causes of delamination.

Accordingly, as glasses for pharmaceutical containers for suppressing delamination, boron free and low boron glasses have been proposed as in PTL 1, and some delamination suppressing effects can be seen. However, there is a problem in that the working points of these glasses are so high that processing into various forms is difficult.

An object of the present invention is to provide a glass for pharmaceutical containers, which is resistant to delamination and has excellent processibility.

Solution to Problem

The present inventors have conducted various studies, and, as a result, found that the problems mentioned above can be solved by the limitation of the $B_2O_3$ content and the addition of $Li_2O$. This finding is proposed as the present invention.

That is, the glass for pharmaceutical containers of the present invention comprises, in mol % on an oxide basis, 69 to 81% of $SiO_2$, 4 to 12% of $Al_2O_3$, 0 to 5% of $B_2O_3$, 5 to 20% of $Li_2O+Na_2O+K_2O$, 0.1 to 12% of $Li_2O$, and 0 to 10% of $MgO+CaO+SrO+BaO$.

The "$Li_2O+Na_2O+K_2O$" herein means the total content of $Li_2O$, $Na_2O$, and $K_2O$. The "$MgO+CaO+SrO+BaO$" herein means the total content of MgO, CaO, SrO, and BaO.

In the present invention, it is preferable that $B_2O_3$ is 0 to 4% in mol % on an oxide basis.

In the present invention, it is preferable that $Na_2O$ is 0 to 11% and $K_2O$ is 0 to 5% in mol % on an oxide basis.

In the present invention, it is preferable that MgO is 0 to 9%, CaO is 0 to 4%, SrO is 0 to 4%, and BaO is 0 to 4% in mol % on an oxide basis.

In the present invention, it is preferable that the glass further comprises 0 to 2 mol % of $ZrO_2$.

In the present invention, it is preferable that the glass has a hydrolytic resistance of Class 1 in a test in accordance with the European pharmacopoeia (i.e., a hydrolytic resistance of Class 1 in a test in accordance with ISO 720). The "hydrolytic resistance in a test in accordance with the European pharmacopoeia" refers to the degree of alkali extraction determined by the follow method.

(1) A glass sample is ground in an alumina mortar and classified into 300 to 425 μm through a sieve.
(2) The obtained powder sample is washed with distilled water and ethanol and dried in an oven at 140° C.
(3) 10 g of the dried powder sample is placed in a quartz flask, further 50 mL of distilled water is added, and the flask is capped and treated in an autoclave. The treatment is performed under the following conditions: the temperature is raised from 100° C. to 121° C. at 1° C./min, then maintained at 121° C. for 30 minutes, and lowered to 100° C. at 0.5° C./min.
(4) After autoclaving, the solution in the quartz flask is transferred to another beaker. Further, the inside of the quartz flask is washed three times with 15 mL of distilled water, and the washing water is also added to the beaker.
(5) A methyl red indicator is added to the beaker, followed by titration with a 0.02 mol/L hydrochloric acid solution.
(6) With 1 mL of the 0.02 mol/L hydrochloric acid solution equivalent to 620 μg of $Na_2O$, the amount of alkali extracted per g of glass is calculated.

In addition, the "hydrolytic resistance of Class 1 in a test in accordance with the European pharmacopoeia" means that the amount of alkali extracted as $Na_2O$ determined as above is 62 μg/g or less.

In the present invention, it is preferable that the alkali resistance in a test in accordance with ISO 695 is at least Class 2. The "test in accordance with ISO 695" herein refers to the follow test.

(1) A 15 cm² glass sample piece with an entirely mirror finished surface is prepared. First, as a pretreatment, the sample is immersed in a solution containing fluoric acid (40 wt %) and hydrochloric acid (2 mol/L) mixed in a volume ratio of 1:9, followed by stirring for 10 minutes with a magnetic stirrer, and then taken out. Next, the sample is ultrasonically cleaned for 2 minutes with ultrapure water three times, and then ultrasonically cleaned for 1 minute with ethanol twice.
(2) Subsequently, the sample is dried in an oven at 110° C. for 1 hour and allowed to cool for 30 minutes in a desiccator.
(3) The mass of sample m1 is measured to an accuracy of ±0.1 mg and recorded.
(4) A 800 mL solution containing an aqueous sodium hydroxide solution (1 mol/L) and an aqueous sodium carbonate solution (0.5 mol/L) mixed in a volume ratio of 1:1 is placed in a stainless steel container and heated to boiling using a mantle heater. After boiling, the sample suspended on a platinum wire is placed therein and maintained boiling for 3 hours.
(5) The sample is taken out, ultrasonically cleaned for 2 minutes with ultrapure water three times, and then ultrasonically cleaned for 1 minute with ethanol twice. Subsequently, the sample is dried in an oven at 110° C. for 1 hour and allowed to cool for 30 minutes in a desiccator.
(6) The mass of sample m2 is measured to an accuracy of ±0.1 mg and recorded.
(7) From the masses of sample before and after placed in the boiling alkaline solution, m1 and m2 (mg), and the total surface area of sample A (cm²), the mass loss per unit area is calculated by the following equation as a measurement value of the alkali resistance test.

(Mass loss per unit area)=100×($m1-m2$)/$A$

The "alkali resistance of Class 2 in a test in accordance with ISO 695" means that the measured value determined as above is 175 mg/dm² or less. Incidentally, when the measured value determined as above is 75 mg/dm² or less, the glass has "an alkali resistance of Class 1 in a test in accordance with ISO 695".

In the present invention, it is preferable that the working point is 1260° C. or less. The "working point" herein means the temperature at which the viscosity of the glass is $10^4$ dPa·s.

The glass for pharmaceutical containers of the present invention comprises, in mol % on an oxide basis, 69 to 81% of $SiO_2$, 4 to 12% of $Al_2O_3$, 0 to 5% of $B_2O_3$, 5 to 20% of $Li_2O+Na_2O+K_2O$, 0.1 to 12% of $Li_2O$, 0 to 11% of $Na_2O$, 0 to 5% of $K_2O$, and 0 to 10% of $MgO+CaO+SrO+BaO$, in which the $Li_2O$ content is higher than the $K_2O$ content.

The glass tube for pharmaceutical containers of the present invention is made of the glass for pharmaceutical containers mentioned above.

Advantageous Effects of Invention

The glass for pharmaceutical containers of the present invention is resistant to delamination and also can be easily processed into a complex shape. In addition, it has excellent hydrolytic resistance and is suitable as a glass material for pharmaceutical containers, such as ampoules, vials, prefilled syringes, and cartridges.

DESCRIPTION OF EMBODIMENTS

The reasons for controlling the range of composition for each component will be described. Incidentally, "%" means "mol %" unless otherwise noted.

$SiO_2$ is one of the components forming the network of the glass. When the content of $SiO_2$ is too low, vitrification is difficult to occur, and also the coefficient of thermal expansion becomes too high, whereby thermal shock resistance is likely to decrease. In addition, the acid resistance of the glass tends to be deteriorated. Meanwhile, when the content of $SiO_2$ is too high, meltability and formability are likely to decrease. Therefore, the content is 69 to 81%, preferably 69 to 80%, still more preferably 70 to 79%, particularly preferably 70 to 78%, and most preferably 73 to 76%.

$Al_2O_3$ is one of the components forming the network of the glass and is effective in improving the hydrolytic resistance of the glass. The content is 4 to 12%, preferably 4.5 to 11%, still more preferably 5 to 10%, and most preferably 5.5 to 7%. When the content of $Al_2O_3$ is law, it is difficult to achieve the hydrolytic resistance of Class 1 in a test in accordance with the European pharmacopoeia. Meanwhile, when the content of $Al_2O_3$ is high, it is difficult to achieve the working point of 1260° C. or less.

$B_2O_3$ is effective in reducing the viscosity of the glass. It is preferable that the content is 0 to 5%, 0 to 4%, 0 to 3%, 0 to 2%, 0 to 1%, and particularly 0 to 0.5%. $B_2O_3$ is believed to be one of the causes of delamination. When the content is high, delamination resistance decreases, and flakes likely to occur. That is, this easily results in a greater amount of $SiO_2$ extracted in a delamination resistance test in accordance with the method described in NPTL 1 than in the case of conventional borosilicate glass. Incidentally, it is preferable that $B_2O_3$ is contained as an essential component in view of the meltability and processability. In this case, it is preferable that the content of $B_2O_3$ is 0.01% or more, particularly 0.05% or more.

$Li_2O$, $Na_2O$, and $K_2O$, which are alkali metal oxides ($R_2O$), are effective in reducing the viscosity of the glass. However, when the total content of these components is high, the amount of alkali extracted from the glass increases, and also the coefficient of thermal expansion increases, resulting in a decrease in thermal shock resistance. The total content of $R_2O$ is 5 to 20%, preferably 7 to 17%, 10 to 15%, 10 to 14.5%, and still more preferably 10.5 to 14.5%.

Among $R_2O$, $Li_2O$ is the most effective in reducing the viscosity of the glass, followed by $Na_2O$, and then $K_2O$. In addition, when the contents are the same, $K_2O$ results in the greatest amount of alkali extracted from the glass, and $Li_2O$ the smallest. Therefore, in the present invention, it is preferable that the content of $R_2O$ is controlled to be $Li_2O \geq Na_2O \geq K_2O$, particularly $Li_2O > Na_2O > K_2O$.

In addition, in the present invention, $Li_2O$ is contained as an essential component. The specific content of $Li_2O$ is 0.1 to 12%, preferably 1.5 to 12%, still more preferably 3 to 11.5%, and particularly 4.5 to 11.5%. It is preferable that the content of $Na_2O$ is 0 to 11%, 1 to 10%, 1 to 8% and particularly 1 to 6%, and the content of $K_2O$ is 0 to 5%, 0.1 to 5% and particularly 1 to 5%.

BaO, SrO, CaO, and MgO, which are alkaline earth metal oxides (R'O), are effective in reducing the viscosity of the glass. They also affect the amount of alkali extracted. However, in the case where these components are included in the glass composition, during use as a pharmaceutical container, an extremely small amount of R'O may be extracted from the glass into the liquid medicine, resulting in the precipitation of a carbonate or sulfate thereof. When the medicine is administered to a human body, such a precipitate may cause a thrombus, or the like, and thus is harmful. Therefore, the total content of R'O is 0 to 10%, preferably 0.1 to 10%, and more preferably 1 to 9%.

Incidentally, whether a carbonate or sulfate of R'O precipitates depends on the solubility of each salt. Specifically, the solubility of MgO is the highest, followed by CaO, SrO, and then BaO. That is, MgO has the lowest likelihood of salt precipitation, and BaO the highest. In addition, when the contents are the same, the amount of alkali extracted from the glass increases in the order of MgO, CaO, SrO, and then BaO. Accordingly, it is preferable that the content of R'O is controlled to be MgO≥CaO≥SrO≥BaO, particularly MgO>CaO>SrO>BaO.

In addition, in the present invention, the glass can contain MgO. Particularly, it is preferable that MgO is contained as an essential component. Specifically, it is preferable that the content of MgO is 0 to 9%, 0.1 to 9%, 0.5 to 8.5%, and particularly 1 to 5%.

It is preferable that the content of CaO is 0 to 4%, 0 to 2%, 0.1 to 2%, and particularly 0.1 to 1%.

It is preferable that the content of SrO is 0 to 4%, particularly 0 to 1%, and, if possible, it is desirable that no SrO is contained. It is preferable that the content of BaO is 0 to 4%, particularly 0 to 1%, and, if possible, it is desirable that no BaO is contained.

$ZrO_2$ is effective in improving the alkali resistance of the glass. However, when much $ZrO_2$ is added, this results in an increase in viscosity and causes deterioration in devitrification resistance. Although $ZrO_2$ is not an essential component in the present invention, when added, it is preferable that the content is 0 to 2%, particularly 0 to 1%.

As a fining agent, one or more of F, Cl, $Sb_2O_3$, $As_2O_3$, $SnO_2$, $Na_2SO_4$, and the like may also be contained. In this case, the total fining agent content is normally 5% or less, particularly preferably 1% or less, and still more preferably 0.5% or less.

Other components may also be contained in addition to the above components. For example, in order to improve chemical durability, high temperature viscosity, or the like, $TiO_2$, $Fe_2O_3$, ZnO, $P_2O_5$, $Cr_2O_3$, $Sb_2O_3$, $SO_3$, $Cl_2$, PbO, $La_2O_3$, $WO_3$, $Nb_2O_3$, $Y_2O_3$, and the like may be added each in an amount up to 3%.

Incidentally, when the glass is to be colored, $TiO_2$ and $Fe_2O_3$ may be added to the batch raw material. In this case, the total content of $TiO_2$ and $Fe_2O_3$ is normally 10% or less.

In addition, as impurities, components such as $H_2$, $CO_2$, CO, $H_2O$, He, Ne, Ar, $N_2$, and the like may be contained each in an amount up to 0.1%. Further, it is preferable that the contents of noble metal elements incorporated as impurities, such as Pt, Rh, and Au, are each 500 ppm or less, preferably 300 ppm or less.

The glass for pharmaceutical containers of the present invention has a hydrolytic resistance of Class 1 in a test in accordance with the European pharmacopoeia. This means that the amount of alkali extracted as $Na_2O$ in the above test is 62 µg/g or less. In the case where the amount of alkali extracted is more than 62 µg/g, when the glass is processed into an ampoule or vial, and a medicine is packed and stored therein, the alkali extracted from the glass may change the properties of medicine components.

In addition, it is preferable that the glass of the present invention has an alkali resistance of at least Class 2 in a test in accordance with ISO 695. This means that the mass loss per unit area in the above test is 175 mg/dm$^2$ or less. The mass loss per unit area is preferably 130 mg/dm$^2$ or less, particularly 75 mg/dm$^2$ or less. Delamination often occurs when a medicine using a citrate or phosphate buffer, or the like, which shows a strong alkaline behavior even at near neutral pH, is packed/stored in a glass container. Thus, the alkali resistance of a glass can be an index of resistance to delamination. When the mass loss per unit area is more than 175 mg/dm$^2$, the possibility of delamination increases.

In addition, it is preferable that the glass of the present invention has a working point of 1260° C. or less, 1240° C. or less, 1230° C. or less, and particularly 1220° C. or less. When the working point is high, the processing temperature at which a material glass tube is processed into an ampoule or vial increases, whereby a significantly increased amount of alkali component evaporates from the glass. The evaporated alkali component adheres to the inner surface of the glass container and causes the change of properties of the medicine packed and stored therein. In addition, when the glass contains boron, boron evaporates and condensates, which can be the cause of delamination.

Next, a method for producing the glass tube for pharmaceutical containers of the present invention will be described. The following explains an example using the Danner method.

First, glass raw materials are formulated in the above glass composition to produce a glass batch. Subsequently, the glass batch is continuously fed into a melting furnace at 1550 to 1700° C. to perform melting and fining. Then, while winding the obtained molten glass around a rotatory refractory, air is blown out from the tip of the refractory, and the glass is drawn from the tip in the form of a tube. The drawn tubular glass is cut into a predetermined length to give a glass tube for pharmaceutical containers. The glass tube thus obtained is used for the production of a vial or ampoule.

Incidentally, the glass tube for pharmaceutical containers of the present invention can be produced not only by the Danner method but also using any of known techniques. For example, the Vello method and a down draw method are also effective as production methods for the glass tube for pharmaceutical containers of the present invention.

EXAMPLES

Hereinafter, the present invention will be described based on the examples.

Tables 1 to 4 show the examples of the present invention (Samples No. 1 to 34) and Table 5 shows comparative examples (Samples No. 35 to 42).

TABLE 1

| | Sample No. | | | | | | | | | |
|---|---|---|---|---|---|---|---|---|---|---|
| | 1 | 2 | 3 | 4 | 5 | 6 | 7 | 8 | 9 | 10 |
| Glass Composition [mol %] | | | | | | | | | | |
| $SiO_2$ | 75.6 | 69.9 | 75.1 | 73.6 | 72.3 | 78.9 | 74.9 | 74.9 | 74.9 | 74.9 |
| $Al_2O_3$ | 5.9 | 11.0 | 4.8 | 6.0 | 6.1 | 6.0 | 6.0 | 6.0 | 6.0 | 6.0 |
| $B_2O_3$ | | | | | | | | | | |
| MgO | 4.9 | 4.5 | 4.5 | 4.6 | 4.6 | 0.9 | 4.5 | 4.5 | 1.5 | 1.5 |

TABLE 1-continued

| | Sample No. | | | | | | | | | |
|---|---|---|---|---|---|---|---|---|---|---|
| | 1 | 2 | 3 | 4 | 5 | 6 | 7 | 8 | 9 | 10 |
| CaO | 0.5 | 0.5 | 0.5 | 0.5 | 0.6 | 0.1 | 0.5 | 0.5 | 1.5 | 1.5 |
| SrO | | | | | | | | | 1.0 | 1.0 |
| BaO | | | | | | | | | 1.0 | 1.0 |
| Li$_2$O | 3.1 | 6.1 | 6.1 | 6.2 | 6.2 | 6.1 | 11.1 | 4.6 | 6.1 | 11.1 |
| Na$_2$O | 8.8 | 5.9 | 5.9 | 5.9 | 6.0 | 5.9 | 1.4 | 4.7 | 5.9 | 1.4 |
| K$_2$O | 1.0 | 1.9 | 1.9 | 2.0 | 2.0 | 1.9 | 1.4 | 4.6 | 1.9 | 1.4 |
| ZrO$_2$ | | | 1.0 | 1.0 | 2.0 | | | | | |
| SnO$_2$ | 0.2 | 0.2 | 0.2 | 0.2 | 0.2 | 0.2 | 0.2 | 0.2 | 0.2 | 0.2 |
| Cl | | | | | | | | | | |
| ΣR$_2$O | 12.9 | 13.9 | 13.9 | 14.1 | 14.2 | 13.9 | 13.9 | 13.9 | 13.9 | 13.9 |
| ΣR'O | 5.4 | 5.1 | 5.1 | 5.1 | 5.2 | 1.0 | 5.0 | 5.0 | 5.0 | 5.0 |
| Strain Point Ps (° C.) | 495 | 535 | 478 | 490 | 509 | 465 | 477 | 480 | 464 | 465 |
| Annealing Point Ta (° C.) | 543 | 584 | 524 | 536 | 555 | 513 | 521 | 528 | 507 | 507 |
| Softening Point Ts (° C.) | 799 | 840 | 764 | 777 | 799 | 763 | 780 | 780 | 733 | 725 |
| Working Point 10$^4$ (° C.) | 1216 | 1250 | 1163 | 1177 | 1185 | 1212 | 1152 | 1211 | 1136 | 1109 |
| Hydrolytic Resistance [μg/g] | | 44 | 62 | 50 | 49 | 34 | 47 | 52 | 59 | 52 |
| Alkali Resistance [mg/dm$^2$] | 52 | 72 | 43 | 47 | 32 | 107 | 64 | 82 | 66 | 65 |
| Delamination Resistance [μg/cm$^2$] | | | | | 1.84 | | | | | |

TABLE 2

| | 11 | 12 | 13 | 14 | 15 | 16 | 17 | 18 | 19 | 20 |
|---|---|---|---|---|---|---|---|---|---|---|
| Glass Composition [mol %] | | | | | | | | | | |
| SiO$_2$ | 74.9 | 74.9 | 74.9 | 74.2 | 73.6 | 73.0 | 71.4 | 75.0 | 75.0 | 73.9 |
| Al$_2$O$_3$ | 6.0 | 6.0 | 6.0 | 5.9 | 5.9 | 5.8 | 5.7 | 7.0 | 7.0 | 6.0 |
| B$_2$O$_3$ | | | | 0.9 | 1.8 | 2.6 | 4.4 | | | |
| MgO | 1.5 | 1.5 | 4.5 | 4.5 | 4.4 | 4.4 | 4.4 | 2.4 | 2.4 | 8.1 |
| CaO | 1.5 | 1.5 | 0.5 | 0.5 | 0.5 | 0.5 | 0.5 | 2.0 | 2.0 | 0.9 |
| SrO | 1.0 | 1.0 | | | | | | | | |
| BaO | 1.0 | 1.0 | | | | | | | | |
| Li$_2$O | 8.1 | 8.1 | 6.1 | 6.1 | 5.9 | 5.9 | 5.9 | 5.0 | 7.0 | 4.6 |
| Na$_2$O | 1.4 | 4.4 | 5.9 | 5.8 | 5.8 | 5.7 | 5.6 | 5.0 | 5.0 | 4.6 |
| K$_2$O | 4.4 | 1.4 | 1.9 | 1.9 | 1.9 | 1.9 | 1.9 | 3.4 | 1.4 | 1.7 |
| ZrO$_2$ | | | | | | | | | | |
| SnO$_2$ | 0.2 | 0.2 | 0.2 | 0.2 | 0.2 | 0.2 | 0.2 | 0.2 | 0.2 | 0.2 |
| Cl | | | | | | | | | | |
| ΣR$_2$O | 13.9 | 13.9 | 13.9 | 13.8 | 13.6 | 13.5 | 13.4 | 13.4 | 13.4 | 10.9 |
| ΣR'O | 5.0 | 5.0 | 5.1 | 5.1 | 4.9 | 4.9 | 4.9 | 4.4 | 4.4 | 9.0 |
| Strain Point Ps (° C.) | 472 | 461 | 472 | 471 | 472 | 472 | 473 | 484 | 478 | 528 |
| Annealing Point Ta (° C.) | 516 | 503 | 518 | 514 | 514 | 512 | 511 | 531 | 524 | 575 |
| Softening Point Ts (° C.) | 743 | 724 | 758 | 745 | 737 | 726 | 710 | 781 | 764 | 825 |
| Working Point 10$^4$ (° C.) | 1140 | 1118 | 1171 | 1152 | 1144 | 1130 | 1116 | 1207 | 1191 | 1234 |
| Hydrolytic Resistance [μg/g] | 58 | 54 | 49 | 49 | 48 | 44 | 40 | | | |
| Alkali Resistance [mg/dm$^2$] | 71 | 62 | 64 | 66 | 68 | 72 | 73 | 64 | 60 | |
| Delamination Resistance [μg/cm$^2$] | | 2.15 | 1.82 | 2.07 | 2.38 | 2.41 | 2.89 | | | |

TABLE 3

| | 21 | 22 | 23 | 24 | 25 | 26 | 27 | 28 | 29 | 30 |
|---|---|---|---|---|---|---|---|---|---|---|
| Glass Composition [mol %] | | | | | | | | | | |
| SiO$_2$ | 70.9 | 76.0 | 74.4 | 71.4 | 77.5 | 77.5 | 77.5 | 77.5 | 77.5 | 77.5 |
| Al$_2$O$_3$ | 6.0 | 5.9 | 6.0 | 9.0 | 6.0 | 6.0 | 6.0 | 6.0 | 6.0 | 6.0 |
| B$_2$O$_3$ | | | | | | | | | | |
| MgO | 8.1 | 4.9 | 4.5 | 4.5 | 1.5 | 1.5 | 2.5 | 2.5 | 2.5 | 3.5 |
| CaO | 0.9 | 0.6 | 0.5 | 0.5 | 0.3 | 0.3 | 0.3 | 0.3 | 0.3 | 0.3 |
| SrO | | | | | | | | | | |
| BaO | | | | | | | | | | |
| Li$_2$O | 6.1 | 1.9 | 6.1 | 6.1 | 6.0 | 7.5 | 5.5 | 6.5 | 7.5 | 6.5 |
| Na$_2$O | 5.9 | 10.1 | 5.9 | 5.9 | 5.5 | 4.0 | 5.0 | 4.0 | 3.0 | 3.0 |
| K$_2$O | 1.9 | 0.4 | 1.9 | 1.9 | 2.5 | 2.5 | 2.5 | 2.5 | 2.5 | 2.5 |
| ZrO$_2$ | | | 0.5 | 0.5 | 0.5 | 0.5 | 0.5 | 0.5 | 0.5 | 0.5 |
| SnO$_2$ | 0.2 | 0.2 | 0.2 | 0.2 | 0.2 | 0.2 | 0.2 | 0.2 | 0.2 | 0.2 |
| Cl | | | | | | | | | | |

TABLE 3-continued

|  | 21 | 22 | 23 | 24 | 25 | 26 | 27 | 28 | 29 | 30 |
|---|---|---|---|---|---|---|---|---|---|---|
| ΣR$_2$O | 13.9 | 12.4 | 13.9 | 13.9 | 14.0 | 14.0 | 13.0 | 13.0 | 13.0 | 12.0 |
| ΣR'O | 9.0 | 5.5 | 5.0 | 5.0 | 1.8 | 1.8 | 2.8 | 2.8 | 2.8 | 3.8 |
| Strain Point Ps (° C.) | 486 | 516 | 480 | 517 | 473 | 474 |  |  | 495 |  |
| Annealing Point Ta (° C.) | 529 | 566 | 527 | 565 | 520 | 521 |  |  | 544 |  |
| Softening Point Ts (° C.) | 752 | 827 | 770 | 815 | 773 | 770 |  |  | 804 |  |
| Working Point 10$^4$ (° C.) | 1137 | 1253 | 1182 | 1225 | 1207 | 1198 | 1247 | 1230 | 1226 | 1257 |
| Hydrolytic Resistance [μg/g] | 62 |  | 46 | 39 | 46 | 44 |  |  | 41 |  |
| Alkali Resistance [mg/dm$^2$] | 81 |  | 51 | 52 | 56 | 57 | 55 | 57 | 51 | 57 |
| Delamination Resistance [μg/cm$^2$] |  |  | 2.24 | 2.04 | 1.56 | 1.55 |  |  | 1.56 |  |

TABLE 4

|  | 31 | 32 | 33 | 34 |
|---|---|---|---|---|
| Glass Composition [mol %] |  |  |  |  |
| SiO$_2$ | 77.0 | 74.0 | 74.3 | 77.0 |
| Al$_2$O$_3$ | 6.0 | 6.0 | 6.0 | 6.0 |
| B$_2$O$_3$ |  | 0.4 | 0.1 |  |
| MgO | 3.5 | 4.5 | 4.5 | 3.5 |
| CaO | 0.3 | 0.5 | 0.5 | 0.3 |
| SrO |  |  |  |  |
| BaO |  |  |  |  |
| Li$_2$O | 7.0 | 6.1 | 6.1 | 6.0 |
| Na$_2$O | 3.0 | 5.9 | 5.9 | 4.0 |
| K$_2$O | 2.5 | 1.9 | 1.9 | 2.5 |
| ZrO$_2$ | 0.5 | 0.5 | 0.5 | 0.5 |
| SnO$_2$ | 0.2 | 0.2 | 0.2 | 0.2 |
| Cl |  |  |  |  |
| ΣR$_2$O | 12.5 | 13.9 | 13.9 | 12.5 |
| ΣR'O | 3.8 | 5.0 | 5.0 | 3.8 |
| Strain Point Ps (° C.) | 486 | 478 | 481 |  |
| Annealing Point Ta (° C.) | 534 | 523 | 527 |  |
| Softening Point Ts (° C.) | 794 | 761 | 769 |  |
| Working Point 10$^4$ (° C.) | 1240 | 1171 | 1179 | 1241 |
| Hydrolytic Resistance [μg/g] | 41 |  | 53 |  |
| Alkali Resistance [mg/dm$^2$] | 52 | 55 | 54 | 50 |
| Delamination Resistance [μg/cm$^2$] | 1.47 | 1.84 |  |  |

The samples were prepared as follows.

First, a 500 g batch was formulated in the composition shown in the table and melted using a platinum crucible at 1650° C. for 3.5 hours. Incidentally, stirring was performed twice during the melting process in order to reduce bubbles in the sample. After melting, an ingot was produced, processed into a shape required for measurement, and subjected to various kinds of evaluation. The results are shown in the tables.

As is clear from the tables, with respect to Samples No. 1 to 34, which are examples of the present invention, the working point was 1257° C. or less, the amount of alkali extracted in a hydrolytic resistance test was 62 μg/g or less, and the amount of alkali extracted in an alkali resistance test was 107 mg/dm$^2$ or less. In addition, the amount of SiO$_2$ extracted in a delamination resistance test was 2.89 μg/cm$^2$ or less.

For the measurement of strain point Ps, the temperature at which the viscosity of the glass was 10$^{14.5}$ dPa·s was determined by Fiber Elongation method in accordance with ASTM C336.

For the measurement of annealing point Ta, the temperature at which the viscosity of the glass was 10$^{13.0}$ dPa·s was determined by Fiber Elongation method in accordance with ASTM C336.

TABLE 5

|  | 35 | 36 | 37 | 38 | 39 | 40 | 41 | 42 |
|---|---|---|---|---|---|---|---|---|
| Glass Composition [mol %] |  |  |  |  |  |  |  |  |
| SiO$_2$ | 76.3 | 76.3 | 77.9 | 74.9 | 74.9 | 74.9 | 68.2 | 64.7 |
| Al$_2$O$_3$ | 4.5 | 6.0 | 6.1 | 6.0 | 6.0 | 6.0 | 5.4 | 5.2 |
| B$_2$O$_3$ | 10.0 |  |  |  |  |  | 8.8 | 13.3 |
| MgO |  | 5.0 | 5.1 | 4.5 | 0.5 | 0.5 | 4.1 | 4.0 |
| CaO | 1.0 | 0.6 | 0.6 | 0.5 | 0.5 | 0.5 | 0.5 | 0.4 |
| SrO |  |  |  |  | 4.0 |  |  |  |
| BaO | 0.5 |  |  |  |  | 4.0 |  |  |
| Li$_2$O |  |  |  | 1.4 | 6.1 | 6.1 | 5.6 | 5.4 |
| Na$_2$O | 6.0 | 11.8 | 6.1 | 1.4 | 5.9 | 5.9 | 5.4 | 5.1 |
| K$_2$O | 1.5 | 0.1 | 4.0 | 11.1 | 1.9 | 1.9 | 1.8 | 1.7 |
| ZrO$_2$ |  |  |  |  |  |  |  |  |
| SnO$_2$ |  | 0.2 | 0.2 | 0.2 | 0.2 | 0.2 | 0.2 | 0.2 |
| Cl | 0.2 |  |  |  |  |  |  |  |
| ΣR$_2$O | 7.5 | 11.9 | 10.1 | 13.9 | 13.9 | 13.9 | 12.7 | 12.2 |
| ΣR'O | 1.5 | 5.5 | 5.6 | 5.0 | 5.0 | 5.0 | 4.7 | 4.4 |
| Strain Point Ps (° C.) | 525 | 562 | 606 | 540 | 466 | 455 | 478 | 479 |
| Annealing Point Ta (° C.) | 570 | 615 | 667 | 596 | 508 | 497 | 513 | 512 |
| Softening Point Ts (° C.) | 785 | 876 | 967 | 879 | 724 | 709 | 689 | 675 |
| Working Point 10$^4$ (° C.) | 1170 | 1297 | 1404 | 1313 | 1115 | 1093 | 1032 | 1014 |
| Hydrolytic Resistance [μg/g] | 17 | 58 | 40 | 96 | 74 | 88 | 41 | 50 |
| Alkali Resistance [mg/dm$^2$] | 130 | 70 | 74 | 100 | 76 | 80 | 94 |  |
| Delamination Resistance [μg/cm$^2$] | 2.73 | 1.98 |  |  |  | 3.05 | 6.16 |  |

For the measurement of softening point Ts, the temperature at which the viscosity of the glass was $10^{7.6}$ dPa·s was determined by Fiber Elongation method in accordance with ASTM C338.

For the measurement of working point, the temperature at which the viscosity of the glass was $10^{4.0}$ dPa·s was determined by a platinum ball pulling up method.

The hydrolytic resistance test was performed in accordance with the European pharmacopoeia. The detailed test procedure is as follows. A glass sample was ground in an alumina mortar and classified into 300 to 425 μm through a sieve. The obtained powder was washed with distilled water and ethanol and dried in an oven at 140° C. 10 g of the dried powder sample was placed in a quartz flask, further 50 mL of distilled water was added, and the flask was capped. The quartz flask containing the sample was placed in an autoclave and treated. The treatment conditions were as follows: the temperature was raised from 100° C. to 121° C. at 1° C./min, then maintained at 121° C. for 30 minutes, and lowered to 100° C. at 0.5° C./min. The solution in the quartz flask was transferred to another beaker. Further, the inside of the quartz flask was washed three times with 15 mL of distilled water, and the washing water was also added to the beaker. A methyl red indicator was added to the beaker, followed by titration with a 0.02 mol/L hydrochloric acid solution. With 1 mL of the 0.02 mol/L hydrochloric acid solution equivalent to 620 μg of $Na_2O$, the amount of alkali extracted was calculated.

The alkali resistance test was performed in accordance with ISO 695. The detailed test procedure is as follows. A 15 $cm^2$ glass sample piece with an entirely mirror finished surface was prepared. First, as a pretreatment, the sample was immersed in a solution containing fluoric acid (40 wt %) and hydrochloric acid (2 mol/L) mixed in a volume ratio of 1:9, followed by stirring for 10 minutes with a magnetic stirrer. The sample was then taken out, ultrasonically cleaned for 2 minutes with ultrapure water three times, and then ultrasonically cleaned for 1 minute with ethanol twice. Subsequently, the sample was dried in an oven at 110° C. for 1 hour and allowed to cool for 30 minutes in a desiccator. The mass of sample m1 was measured to an accuracy of ±0.1 mg and recorded. A 800 mL solution containing an aqueous sodium hydroxide solution (1 mol/L) and an aqueous sodium carbonate solution (0.5 mol/L) mixed in a volume ratio of 1:1 was placed in a stainless steel container and heated to boiling using a mantle heater. After boiling, the sample suspended on a platinum wire was placed therein and maintained boiling for 3 hours. The sample was taken out, ultrasonically cleaned for 2 minutes with ultrapure water three times, and then ultrasonically cleaned for 1 minute with ethanol twice. Subsequently, the sample was dried in an oven at 110° C. for 1 hour and allowed to cool for 30 minutes in a desiccator. The mass of sample m2 was measured to an accuracy of ±0.1 mg and recorded. From the masses of sample before and after placed in the boiling alkaline solution, m1 and m2 (mg), and the total surface area of sample A ($cm^2$), the mass loss per unit area was calculated by the following equation as a measurement value of the alkali resistance test.

(Mass loss per unit area)=$100 \times (m1-m2)/A$

The delamination resistance test was performed in accordance with the method described in NPTL 1. However, because there are differences in the sample from, or the like, the method described in NPTL 1 was used with some modifications. The detailed procedure is as follows. A glass piece with an entirely mirror finished surface having a surface area of about 13 $cm^2$ was prepared and, in order to replicate thermal processing for the production of a container, heated for 20 seconds at the softening point of each sample. Subsequently, a Teflon (registered trademark) container was filled with a 0.9% aqueous NaCl solution adjusted to pH 8.0 with an aqueous $Na_2HPO_4$ solution. The sample was immersed therein, and the container was capped. The Teflon container containing the sample was placed in an autoclave and treated. The treatment conditions were as follows: the temperature was raised from 100° C. to 121° C. at 1° C./min, maintained at 121° C. for 1 hour, and lowered to 100° C. at 0.5° C./min. Using ICP-OES (Inductively Coupled Plasma Optical Emission Spectrometry), the amount of $SiO_2$ that had been extracted into the solution through the treatment was determined as the amount of extractable relative to the surface area of the sample (μg/$cm^2$). The amount of $SiO_2$ extracted is used as an index of delamination resistance. The smaller the amount of $SiO_2$ extracted is, the higher delamination resistance such a glass is considered to have.

While the present invention has been described in detail and with reference to specific embodiments thereof, it will be apparent to one skill in the art that various changes and modifications can be made therein without departing from the spirit and scope thereof. All references cited herein are incorporated in their entirety. This application is based on Japanese patent application No. 2013-119894 filed on Jun. 6, 2013, the entire contents of which are incorporated hereinto by reference.

The invention claimed is:

1. A glass for pharmaceutical containers comprising, in mol % on an oxide basis, 69 to 81% of $SiO_2$, 4 to 12% of $Al_2O_3$, 0 to 5% of $B_2O_3$, 5 to 20% of $Li_2O+Na_2O+K_2O$, 3.1 to 12% of $Li_2O$, 0.1 to 9% of MgO, and 0.1 to 4% of Cao, wherein MgO≥CaO≥SrO≥BaO, and 10%≥of MgO+CaO+SrO+BaO.

2. The glass for pharmaceutical containers according to claim 1, comprising, in mol % on an oxide basis, 0 to 4.4% of $B_2O_3$.

3. The glass for pharmaceutical containers according to claim 1, comprising, in mol % on an oxide basis, 0 to 11% of $Na_2O$ and 0 to 5% of $K_2O$.

4. The glass for pharmaceutical containers according to claim 1, wherein $Li_2O \geq Na_2O \geq K_2O$.

5. The glass for pharmaceutical containers according to claim 1, comprising, in mol % on an oxide basis, 4.5 to 12% of $Li_2O$.

6. The glass for pharmaceutical containers according to claim 1, comprising, in mol % on an oxide basis, 0.9 to 9% of MgO, 0 to 4% of SrO, 0 to 4% of BaO, and 1 to 10% of MgO+CaO+SrO+BaO.

7. The glass for pharmaceutical containers according to claim 1, wherein MgO>CaO≥SrO≥BaO.

8. The glass for pharmaceutical containers according to claim 1, comprising, in mol % on an oxide basis, 0.1 to 2% of CaO.

9. The glass for pharmaceutical containers according to claim 1, further comprising 0 to 2 mol % of $ZrO_2$.

10. The glass for pharmaceutical containers according to claim 1, having a hydrolytic resistance of Class 1 in a test in accordance with the European pharmacopoeia.

11. The glass for pharmaceutical containers according to claim 1, having an alkali resistance of at least Class 2 in a test in accordance with ISO 695.

12. The glass for pharmaceutical containers according to claim 1, having a working point of 1260° C. or less.

13. A glass tube for pharmaceutical containers, made of the glass for pharmaceutical containers of claim 1.

14. A glass for pharmaceutical containers comprising, in mol % on an oxide basis, 69 to 81% of $SiO_2$, 4 to 12% of $Al_2O_3$, 0 to 5% of $B_2O_3$, 5 to 20% of $Li_2O+Na_2O+K_2O$, 3.1 to 12% of $Li_2O$, 0 to 11% of $Na_2O$, 0 to 5% of $K_2O$, 0.1 to 9% of MgO, and 0.1 to 4% of CaO, wherein MgO≥CaO, and 10%≥MgO+CaO+SrO+BaO, and wherein the $Li_2O$ content is higher than the $K_2O$ content.

15. The glass for pharmaceutical containers according to claim 14, wherein $Li_2O≥Na_2O≥K_2O$.

16. The glass for pharmaceutical containers according to claim 14, wherein MgO>CaO≥SrO≥BaO.

17. The glass for pharmaceutical containers according to claim 14, comprising, in mol % on an oxide basis, 0.1 to 2% of CaO.

18. A glass for pharmaceutical containers comprising, in mol % on an oxide basis, 69 to 81% of $SiO_2$, 4 to 12% of $Al_2O_3$, 0 to 5% of $B_2O_3$, 5 to 20% of $Li_2O+Na_2O+K_2O$, 0.1 to 12% of $Li_2O$, 0 to 2% CaO, and 0.1 to 10% of MgO+CaO+SrO+BaO.

* * * * *